United States Patent Office 3,361,840
Patented Jan. 2, 1968

3,361,840
PROCESS FOR PREPARING DIMERS AND CO-DIMERS OF OLEFINS
Charles F. Kohll and Robert van Helden, Amsterdam, Netherlands, assignors to Shell Oil Company, New York, N.Y., a corporation of Delaware
No Drawing. Filed June 8, 1964, Ser. No. 373,508
Claims priority, application Netherlands, June 27, 1963, 294,637
10 Claims. (Cl. 260—683.15)

ABSTRACT OF THE DISCLOSURE

Dimer products are produced by dimerizing or co-dimerizing $C_2$ to $C_9$ olefinically unsaturated compounds in the presence of a catalytic mixture of a Group VIII noble metal salt and an organic nitro compound, in substantially anhydrous liquid medium, and at substantially atmospheric pressure.

---

This invention relates to a novel catalytic process for effecting the interaction of olefinic compounds and more particularly to the preparation of dimers and co-dimers of olefins.

In many chemical synthesis and/or refinery operations, it is often desirable to convert lower olefinic compounds to higher olefinic compounds by polymerization. For example, in the catalytic cracking of petroleum products substantial quantities of ethylene are produced and it is desirable to polymerize the ethylene to a dimer which tends to be more valuable. Similarly, in other instances, it is often desirable to polymerize olefins with a greater number of carbon atoms than ethylene with themselves or other olefinic compounds to form dimers and/or co-dimers.

Thus, this invention is primarily concerned with the formation of 1:1 molar adducts, i.e., dimers or co-dimers of olefinic compounds depending on whether a single monomer or two different monomers are used. In this regard, it should be noted that the polymerization is specific, forming selectively either a dimer and/or co-dimer without material formation of higher molecular weight polymeric compounds, i.e., trimers, and so on.

Dimers and co-dimers of alpha-olefins (terminal olefins) can be prepared according to the process described in U.S. 3,013,066. The process described therein requires that the interaction of the alpha olefins be accomplished in an anhydrous reaction medium and in the presence of salts of the noble metals of Group VIII of the Periodic Table. Further, high pressure conditions of at least 10 atmospheres and preferably between 50 and 1500 atmospheres are required in order to effect the co-dimerization and/or dimerization at temperatures from 20° to 275° C. These high pressures detract from the commercial utility of such a process since they require apparatus compatible with such pressures.

Accordingly, it is an object of the present invention to provide a process for effecting the interaction of olefins at much milder conditions than those previously described.

Another object is to provide an improved catalytic process for the interaction of olefins to form 1:1 molar adducts without additional polymerization to higher molecular weight polymers.

The above objects and others apparent from the specific description which follows are accomplished by effecting dimerization and/or co-dimerization of olefins in an anhydrous liquid medium in the presence of a catalytic mixture of a salt of the noble metals of Group VIII and an organic nitro compound.

The catalytic action of the mixture of the salt of the noble metals of Group VIII and the organic nitro compound is such that the dimerization and/or co-dimerization of olefins can be effected at pressures substantially below those disclosed in the prior art. In fact, the preferred pressure for this new process is atmospheric, which is advantageous in that no special pressure equipment is required to carry out the process. Of course, the pressure can vary from sub-atmospheric to super-atmospheric conditions in the preferred pressure range from 0.5 to 1.5 atmospheres. Lower sub-atmospheric pressures may be used; however, this would destroy some of the economies of the process since reflux equipment would be required. Such additional equipment detracts from the economic advantages of carrying out the process at atmospheric pressures in relatively simple equipment.

Superior catalytic activity is achieved in this process by mixing a salt of a noble metal of Group VIII of the Periodic Table and an organic nitro compound to form a catalytic mixer. Most metal salts in which the sole positive metal ion is that of the noble metal of Group VIII can be used as co-catalyst with the organic nitro compound. The noble metals of this group consist specifically of ruthenium, rhodium, palladium, osmium, iridium and platinum. The anion of the salts of these noble metals are preferably chlorides, bromides, iodides, sulfates, nitrates, and carboxylates having up to 11 carbon atoms. Some noble metal salts are more soluble than others and the particular salt used may be selected on the basis of its solubility in the anhydrous reaction medium. Favorable results have been obtained with palladium dichloride, the preferred noble metal salt, and satisfactory results have been achieved with the sulfates, carbonates, nitrates and thioalcoholates of the noble metals with the noble metal acetates and pivalates also showing good results.

The other compound in the catalytic mixture besides a salt of the noble metals is an organic nitro compound and it is the co-action of the organic nitro compound with the salt of the noble metal which enables this process to be carried out at milder conditions of pressure and temperature than previously known processes. More specifically, the organic nitro compound must have at least one nitro group per molecule and can have several such nitro groups. These nitro groups must be bonded directly to a carbon atom by a C—N linkage, preferably in a hydrocarbon aliphatic, cycloaliphatic and/or aromatic residue. Likewise, the nitro group(s) can be bonded to carbon atoms of other organic radicals.

Specially preferred are the aliphatic nitro compounds, including the cycloaliphatic compounds, in which the nitro group or groups are bonded to a non-terminal carbon atom. It is immaterial if the aliphatic hydrocarbon chain is branched or unbranched and the more preferable nitro compounds are those in which the nitro group is bonded to an aliphatic residue having no more than 6 carbon atoms. While hydrocarbon residues having only nitro substituents are preferred, it should be appreciated that such hydrocarbon residues can contain non-interfering substituents such as halogen atoms, amino groups, ether or ester groups, as well as the nitro groups. The more preferred organic nitro compounds of those with the additional above-mentioned substituents are those containing no more than 6 carbon atoms per molecule.

Excellent results have been obtained with nitro alkanes, such as 2-nitropropane, and other suitable specific organic nitro compounds are: nitromethane, nitroethane, 1-nitro-2-methylpropane, nitrobutane, 1,4-dinitrobutane, nitrobenzene, nitro and dinitrotoluenes, phenylnitromethane, nitrocyclohexane, 1-nitrodiethyl ether, 1-diethyl-amino-3-nitropropane, nitroacetic ethyl ester, nitro acetone and higher nitro ketones, 1-nitro-2-chloropropane and halogenized nitrobutanes.

In preparing the catalytic mixture it is essential that the organic nitro compounds are present in at least stoichiometric portions to that of the noble metal salt. Such equal molar proportion of the co-acting catalytic agent works satisfactorily in any inert anhydrous liquid medium suitable for carrying out the process. However, since the nitro compounds themselves make excellent solvents or co-solvents for the reaction, it is preferred that they be used in excess to provide the liquid anhydrous medium used for the process. Thus, in most cases it will be desirable to use a rather large excess of the organic nitro compound if it is a liquid at standard conditions of temperature and pressures.

Generally, when the anhydrous liquid medium contains catalytic amounts of noble metal salts plus at least an equal amount of the organic nitro compound the reaction proceeds smoothly. Since the preferred method of carrying out the reaction is to use the organic nitro compound as a solvent or co-solvent there will generally always be an excess of the organic nitro compound. Generally, the concentration of the noble metal salt will be between 0.01 and 0.1 molar but the use of greater or lesser concentrations may be advantageous depending upon the particular olefins to be reacted and/or the organic nitro compound used.

Reference has been made to anhydrous liquid media and by this terminology is meant inert liquid media being substantially free of water. A high water content in the reaction medium is undesirable because of the relatively large quantities of by-products formed when water is present and the water content should be maintained below 10% and preferably below 5% by weight. A lower water content than 5% by weight is desirable.

As stated before, the organic nitro compounds preferably provide the anhydrous liquid medium for the reaction. However, other liquid solvent media which are inert, such as ketones, hydrocarbons, amides, nitriles, furans and esters may be used as solvents and/or co-solvents. Specifically, acetone methyl ethyl ketone, dimethylformamide, acetonitrile, 1,2-dimethoxyethane, tetrahydrofuran and ethyl acetate are examples of compounds which are useful as liquid solvents and/or co-solvents; mixtures of these liquids may also be used.

The invention can be conducted at or near room temperatures. Temperatures from 0° to 120° C. are satisfactory and the preferred temperature range is from 20° to 70° C. Thus, it is possible to practice the invention at milder conditions of both temperature and pressure (particularly pressure) than used in similar processes, because of the catalytic co-action of the noble metal salt and the organic nitro compounds.

Generally, this process contemplates the formation of dimers and/or co-dimers of olefinic compounds having from 2–9 carbon atoms. Monoolefinic unsaturated compounds are more preferred, however, polyolefins such as butadiene, isoprene and bicyclo(2.2.1)hepta-2,5-diene will also dimerize and/or co-dimerize according to the present invention. The most preferred group of olefinic unsaturated compounds are olefinic hydrocarbons having from 2 to 5 carbon atoms per molecule and, of this group, those having the unsaturation in the alpha or terminal position are the most preferred. In practice, the process has been very effective in dimerizing and/or co-dimerizing ethylene, propylene and butene-1.

The olefinically unsaturated hydrocarbons described above may have one or more hydrogen atoms replaced by other atoms or groups of atoms, especially halogen atoms. For example, the following compounds are satisfactory in the process: vinylchloride, vinylbromide, vinylfluoride, methoxyethylene, 1-chlorobutene-1, 1-chlorobutene-2 and chloroprene.

A preferred method of practicing this invention is to mix the noble metal salt with the organic nitro compound in equal molar proportions and subsequently add the catalytic mixture to an excess of the nitro compound or, alternatively, to an inert solvent medium as described above. Once the catalytic mixture has been added to the liquid reaction medium, the olefinic unsaturated compound to be dimerized or such olefinic compounds such as are to be co-dimerized and/or dimerized are then added to the liquid medium. If the olefinic unsaturated compound is gaseous, such as ethylene, it may be bubbled into the liquid medium. Otherwise it is merely mixed into the liquid medium. After the olefinic unsaturated compounds are added to the liquid phase, the reaction begins and may be accelerated by maintaining the temperature between 20° and 70°.

Surprisingly, in most cases, the reaction product consists almost entirely of a dimer and/or co-dimer of the olefinic unsaturated compound or compounds. A mixture of dimers and co-dimers is obtained when two different monomers are employed as reactants.

After the reaction has completed, the reaction products can be recovered from the liquid medium by fractional distillation and any remaining monomeric reactants separated from the dimer and/or co-dimer product. The reaction products may be further refined according to well-known physical and/or chemical methods.

The examples appended below are solely for the purposes of illustration and the details thereof are not intended to limit the present invention.

*Example I*

Ethylene was passed through a mixture of 0.1 mol $PdCl_2$ and 3.33 mol 2-nitropropane at a temperature of 40–45° C. and a pressure of 1 atm.

After about one hour a yellow complex began to separate, consisting of $PdCl_2$ and the olefin absorbed in the mixture.

Five hours after the introduction of the ethylene had been started, the absorption rate of the olefin increased rapidly and reached a maximum value after one or two hours. Thereupon the absorption rate gradually decreased again. It was observed that the complex formed initially entered into reaction with nitropropane while forming a dark red solution. Moreover gaseous products were evolved, which escaped from the mixture and were collected.

After 28.5 hours the experiment was terminated. At the moment of termination the quantity of gas collected amounted to 58 grams. Of this quantity 96.7%m was butene (63.5%m transbutene-2, 27.9%m cis-butene-2 and 5.3%m butene-1). The remaining quantity consisted of 1.7%m ethylene, 0.7%m hexene and 1%m nitropropane which had been entrained.

*Example II*

Into an anhydrous mixture of 0.077 mol palladium chloride and 4.63 mol nitromethane ethylene was introduced at a rate of 3.5 l./hour with intensive stirring at a temperature of 40–45° C. and at atmospheric pressure.

After 14.5 hours the supply of ethylene was stopped. During this period the gasses escaping from the reaction mixture, and consisting of a mixture of non-converted ethylene and oligomeric products, were led to a refrigerating vessel, in which the temperature was −80° C.

Thereupon the volatile compounds (31.2 grams) collected in the refrigerating vessel were analyzed with the aid of gas-liquid chromatography. The analysis revealed that 0.546 mol butenes (a mixture of 67.8% transbutene-2, 27.4% cis-butene-2 and 4.8% butene-1) and 0.007 mol hexene had formed.

In the above description, "dimer" has been used in a restrictive sense indicating a 1:1 adduct of like monomers and "co-dimer" was used to indicate a 1:1 adduct of unlike monomers. This was purposely done for reasons of clarity but in the claims "dimer" is used in a generic sense, including the 1:1 adducts of like or unlike monomers.

We claim as our invention:

1. A process for preparing dimer products by contacting in a substantially anhydrous liquid medium a $C_2$ to $C_9$ mono-olefin with a $C_2$ to $C_9$ mono-olefin in the presence of a catalytic mixture consisting of a chloride or bromide salt of a noble metal of Group VIII of the Periodic Table and a $C_1$ to $C_6$ nitro alkane, wherein the nitro alkane is present in proportions at least equimolar to the salt of the noble metal, at a pressure of about 0.5 to about 1.5 atmospheres and at a temperature from about 0° C. to about 120° C.

2. A process according to claim 1 in which the noble metal is palladium.

3. A process according to claim 1 in which the nitro alkane is present in substantial excess relative to the salt of the noble metal.

4. A process for preparing dimer products by contacting a $C_2$ to $C_5$ mono-olefin with a $C_2$ to $C_5$ mono-olefin in a substantially anhydrous liquid medium in the presence of a catalytic mixture consisting of a chloride or bromide salt of a noble metal of Group VIII and a $C_1$ to $C_6$ nitro alkane wherein the nitro alkane is present in proportions at least equimolar to the salt of the noble metal, at a pressure from about 0.5 to about 1.5 atmospheres and at a temperature from about 0° C. to about 120° C.

5. A process according to claim 4 in which the salt of the noble metal is palladium chloride.

6. A process according to claim 5 in which the nitro alkane is present in substantial excess relative to the palladium chloride.

7. A process according to claim 6 in which the substantially anhydrous liquid medium contains less than 5% by weight of water.

8. A process for preparing dimer products by contacting ethylene in a substantially anhydrous liquid medium in the presence of palladium chloride and 2-nitropropane, wherein the 2-nitropropane is present in proportions at least equimolar to the palladium chloride at a temperature from about 20° C. to about 70° C. and at substantially atmospheric pressure.

9. A process for preparing dimer products by contacting a $C_2$ to $C_4$ alpha olefin with a $C_2$ to $C_4$ alpha olefin in a substantially anhydrous medium, in the presence of palladium chloride and 2-nitropropane, wherein the 2-nitropropane is present in proportions at least equimolar to the palladium chloride, at a temperature from about 20° to about 70° C. and at substantially atmospheric pressure, and thereafter recovering the reaction products.

10. The process according to claim 9 in which the 2-nitropropane is present in a large molar excess.

References Cited

UNITED STATES PATENTS

| | | | |
|---|---|---|---|
| 2,085,535 | 6/1937 | Langedijk et al. | 260—683.15 |
| 3,013,066 | 12/1961 | Alderson | 252—441 X |
| 3,296,227 | 1/1967 | Burleigh et al. | 260—683.15 X |

FOREIGN PATENTS

| | | |
|---|---|---|
| 421,118 | 12/1934 | Great Britain. |
| 887,362 | 1/1962 | Great Britain. |

OTHER REFERENCES

Olah: Friedel-Crafts and Related Reactions, 1963, published by Interscience, New York, vol. I, pp. 251, 281 and 282.

PAUL M. COUGHLAN, JR., *Primary Examiner.*